United States Patent
Kuraki et al.

(10) Patent No.: US 9,111,358 B2
(45) Date of Patent: Aug. 18, 2015

(54) DIGITAL-WATERMARK EMBEDDING DEVICE, DIGITAL-WATERMARK EMBEDDING METHOD, AND DIGITAL-WATERMARK DETECTING DEVICE

(75) Inventors: Kensuke Kuraki, Ichikawa (JP); Taizo Anan, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 13/605,325

(22) Filed: Sep. 6, 2012

(65) Prior Publication Data

US 2013/0148842 A1   Jun. 13, 2013

(30) Foreign Application Priority Data

Dec. 13, 2011   (JP) .................. 2011-272777

(51) Int. Cl.
*G06K 9/00* (2006.01)
*G06T 1/00* (2006.01)

(52) U.S. Cl.
CPC ....... *G06T 1/0085* (2013.01); *G06T 2201/0051* (2013.01)

(58) Field of Classification Search
CPC ............................... G06T 1/0021; G06K 9/00
USPC ........................................................ 382/100
See application file for complete search history.

(56) References Cited

U.S. PATENT DOCUMENTS

| | | | | |
|---|---|---|---|---|
| 6,810,131 | B2 * | 10/2004 | Nakagawa et al. | 382/100 |
| 7,228,001 | B2 * | 6/2007 | Kobayashi et al. | 382/247 |
| 8,045,624 | B2 * | 10/2011 | Isu et al. | 375/240.26 |
| 8,091,108 | B2 * | 1/2012 | Gupta | 725/86 |

FOREIGN PATENT DOCUMENTS

| | | |
|---|---|---|
| JP | 2000-349701 | 12/2000 |
| JP | 2001-202443 | 7/2001 |
| JP | 2003-163901 | 6/2003 |
| JP | 2004-247883 | 9/2004 |
| JP | 2005-109918 | 4/2005 |

OTHER PUBLICATIONS

Japanese Office Action issued Jun. 9, 2015 in corresponding Japanese Patent Application No. 2011-272777.

\* cited by examiner

*Primary Examiner* — Shefali Goradia
(74) *Attorney, Agent, or Firm* — Staas & Halsey LLP

(57) ABSTRACT

A digital-watermark embedding device includes a content obtaining unit that obtains content; a watermark-information obtaining unit that obtains digital-watermark information; a generating unit that generates a synchronization flag on a basis of the digital-watermark information; and an embedding unit that embeds the digital-watermark information and the synchronization flag into the content.

13 Claims, 19 Drawing Sheets

PHASE DIFFERENCE OF 180°

(a): 0   (b): 1

(c): RELATIONSHIP BETWEEN DIGITAL-WATERMARK EMBEDDING AND BRIGHTNESS OF IMAGE

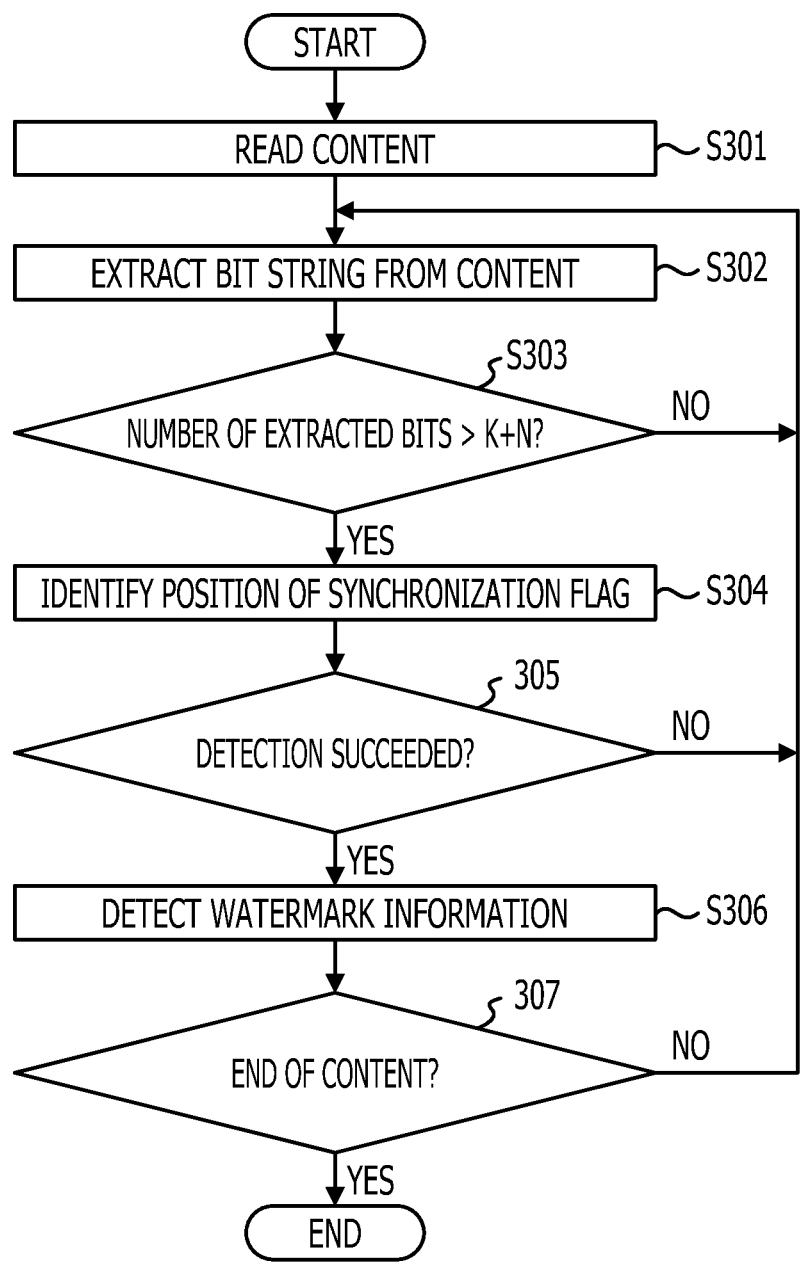

DIGITAL-WATERMARK EMBEDDING DEVICE, DIGITAL-WATERMARK EMBEDDING METHOD, AND DIGITAL-WATERMARK DETECTING DEVICE

CROSS-REFERENCE TO RELATED APPLICATION(S)

This application is based upon and claims the benefit of priority of the prior Japanese Patent Application No. 2011-272777, filed on Dec. 13, 2011, the entire contents of which are incorporated herein by reference.

FIELD

The embodiments discussed herein are related to a digital-watermark embedding device, a digital-watermark embedding method, and a digital-watermark detection method that use digital-watermark information for digital content.

BACKGROUND

The digital watermark is a technology for embedding additional information into image data and audio data so that the additional information is not recognizable by humans. When copyright information of content or purchase information of a user is embedded as digital watermark, if the content is fraudulently leaked, the presence/absence of copyright information and the source of the leak can be identified.

For example, a digital-watermark embedding device embeds digital-watermark information to content in conjunction with a unique secret data flag, and the digital-watermark information is extracted through detection of the secret data flag. The secret data flag is also called a "synchronization flag". For example, Japanese Laid-open Patent Publication Nos. 2005-109918 and 2001-202443 disclose technologies in which a secret data flag is generated from a random number and the generated secret data flag is embedded into content.

SUMMARY

In accordance with an aspect of the embodiments, a digital-watermark embedding device includes a content obtaining unit that obtains content; a watermark-information obtaining unit that obtains digital-watermark information; a generating unit that generates a synchronization flag on a basis of the digital-watermark information; and an embedding unit that embeds the digital-watermark information and the synchronization flag into the content.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 19 is a flowchart illustrating one example of digital-watermark detection processing in the third embodiment.

DESCRIPTION OF EMBODIMENTS

Figure 1:
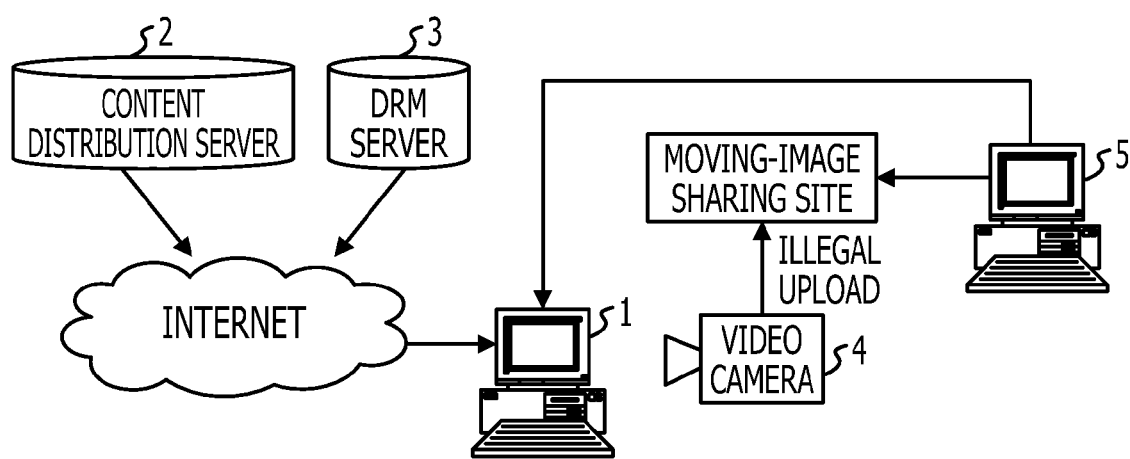
FIG. 1 illustrates one example of the configuration of a system according to an embodiment.

First, a description will be given of an exemplary system to which a digital-watermark embedding device or a digital-watermark detecting device according to the present disclosure is applied. FIG. 1 illustrates one example of the configuration of a system according to an embodiment. In the example illustrated in FIG. 1, the system includes an information processing device 1, a content distribution server 2, a DRM server 3, a video camera 4, and an information processing device 5.

The content distribution server 2 holds content, such as moving-image data and audio data and distributes the content to the information processing device 1 that has requested the content.

The DRM (digital rights management) server 3 holds user IDs (identifiers) and distributes the user ID to the information processing device 1 that requested the content.

The information processing device 1 holds a digital-watermark embedding program for embedding the user ID into the content as digital-watermark information. The information processing device 1 executes the digital-watermark embedding program to embed the user ID, obtained from the DRM server 3, into the content obtained from the content distribution server 2. The digital-watermark information may be predetermined information, such as copyright information, other than the user ID. The digital-watermark information may also be referred to as "watermark information".

The information processing device 1 may embed watermark information, stored in a storage unit therein, into content stored in the storage unit. The information processing device 1 displays, on a display unit, the content in which the watermark information is embedded.

It is assumed that, in this case, the video camera 4 photographs the content displayed on the display unit and illegally uploads the photographed content onto a moving-image sharing site.

The information processing device 5 holds a detection program for detecting digital watermark from content. For example, a monitoring entity operates the information processing device 5. The information processing device 5 detects the watermark information from the content uploaded on the moving-image sharing site and also detects the user ID. The monitoring entity identifies a user who leaked the content and issues a warning to the user.

The system illustrated in FIG. 1 is merely one example and is not limited to the above-described system configuration. The disclosed digital-watermark embedding device and digital-watermark detecting device are applicable to a system that embeds and detects watermark information.

The information processing device 1 that functions as the digital-watermark embedding device will be described first.

Figure 2:
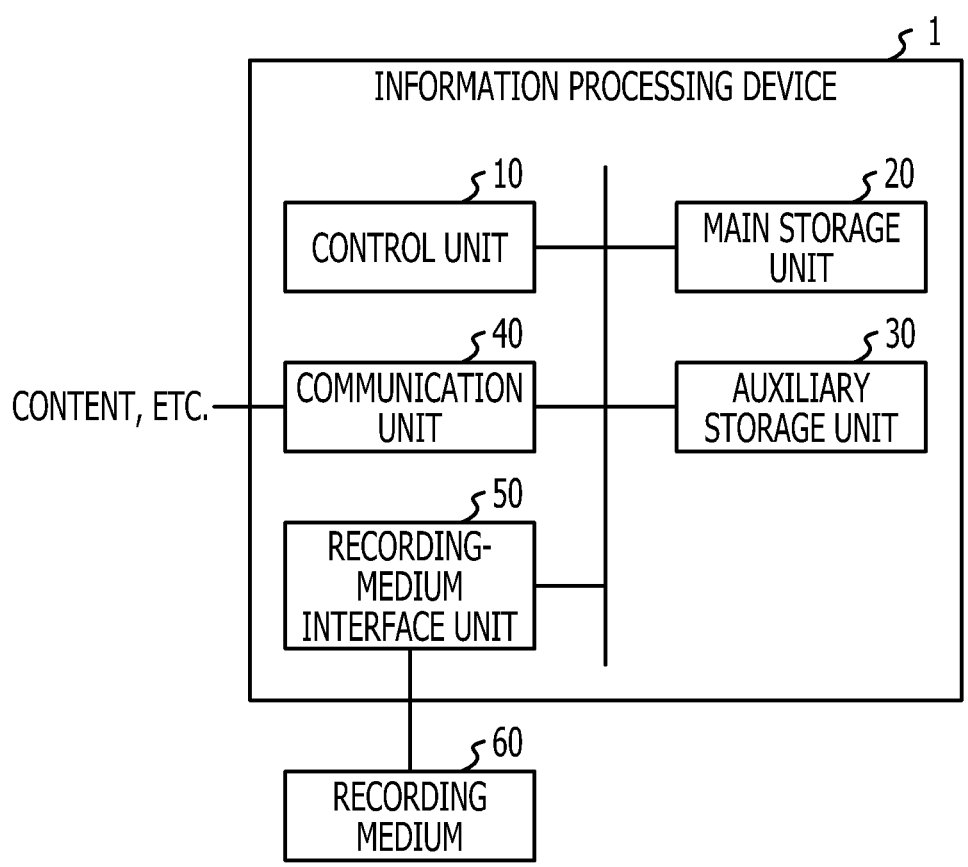
FIG. 2 illustrates one example of the configuration of an information processing device.

FIG. 2 illustrates one example of the configuration of the information processing device 1. The information processing device 1 illustrated in FIG. 2 functions as the digital-watermark embedding device for detecting digital-watermark information. The information processing device 1 illustrated in FIG. 2 includes a control unit 10, a main storage unit 20, an auxiliary storage unit 30, a communication unit 40, and a recording-medium interface unit 50. Those units are interconnected through a bus so as to enable data translation and reception.

The control unit 10 may be a CPU (central processing unit) that controls the units in the information processing device 1 and that also computes and processes data. The control unit 10 also functions as a computing device that executes a program stored in the main storage unit 20 and/or the auxiliary storage unit 30. The control unit 10 receives data from the communication unit 40 or from the main storage unit 20 and/or the auxiliary storage unit 30, computes and processes the data, and then outputs the resulting data to, for example, an output unit (not illustrated), the main storage unit 20, or the auxiliary storage unit 30.

The control unit 10 also realizes a digital-watermark embedding function by executing the program for embedding digital-watermark information stored in, for example, the auxiliary storage unit 30.

The main storage unit 20 is a storage device that stores or temporarily holds an OS (operating system, which is basic software) and programs, such as application software, executed by the control unit 10, as well as data. Examples of the main storage unit 20 include a ROM (read only memory) and a RAM (random access memory).

The auxiliary storage unit 30 is a storage device, such as a HDD (hard disk drive), that stores data related to application software and so on. The auxiliary storage unit 30 stores therein digitized content, such as video and music, and watermark information obtained from the communication unit 40.

The auxiliary storage unit 30 may also store therein content and digital-watermark information obtained from, for example, a recording medium 60.

The communication unit 40 performs wired or wireless communication. The communication unit 40 obtains, for example, content, such video and music, and digital-watermark information from a server or the like and stores the content and the digital-watermark information in, for example, the auxiliary storage unit 30.

The recording-medium interface unit 50 is an interface between the information processing device 1 and the recording medium 60 (e.g., a flash memory), which is connected through a data transmission line, such as a USB (universal serial bus) cable.

A predetermined program is stored in the recording medium 60 and the predetermined program stored therein is installed to the information processing device 1 via the recording-medium interface unit 50. The information processing device 1 then executes the installed predetermined program.

For example, when the recording medium 60 is realized by an SD (secure digital) card, the recording-medium interface unit 50 may be an SD card slot.

Figure 3:
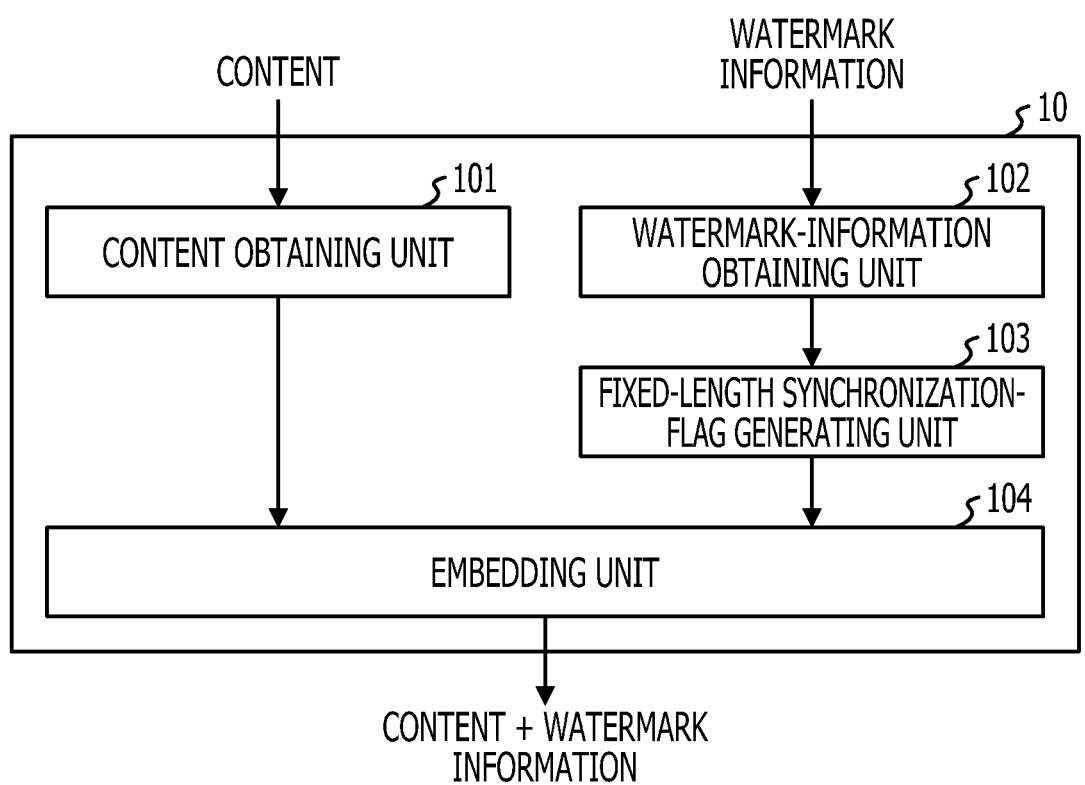
FIG. 3 is a block diagram illustrating one example of a digital-watermark embedding function in a first embodiment.

The control unit 10 having the function for embedding digital-watermark information will be described next in detail. FIG. 3 is a block diagram illustrating one example of the digital-watermark embedding function in a first embodiment. The control unit 10 illustrated in FIG. 3 includes a content obtaining unit 101, a watermark-information obtaining unit 102, a fixed-length synchronization-flag generating unit 103, and an embedding unit 104. The content obtaining unit 101, the watermark-information obtaining unit 102, the fixed-length synchronization-flag generating unit 103, and the embedding unit 104 may also be, for example, a hardware circuit with a wired logic.

The content obtaining unit 101 obtains content received from the content distribution server 2. The content obtaining unit 101 may also obtain content stored in, for example, the auxiliary storage unit 30. The obtained content is output to the embedding unit 104.

For example, the content obtaining unit 101 divides a moving image, which is the obtained content, into frames. The content obtaining unit 101 also converts the image format of the frames, as appropriate. For example, when the format of the input frames is a YUV format, the content obtaining unit 101 converts the format into an RGB format or the like.

The watermark-information obtaining unit 102 obtains, as watermark information, the user ID received from the DRM server 3. Although the user ID is used as the watermark information in this case, the information to be embedded may be any information such as information regarding a copyright.

The watermark-information obtaining unit 102 converts the obtained watermark information into a string of bits "0" and "1". For example, when the watermark information is text information "FUJITSU", the watermark-information obtaining unit 102 can represent the text information in a hexadecimal representation "0×46(F)0×55(U)0×4A(J)0×49(I)0×54(T)0×53(S)0×55(U)" by converting the text into ASCII code.

When converting the hexadecimal representation into a decimal representation, the watermark-information obtaining unit 102 can obtain a bit string "01000110(F)01010101(U)01001010(J)01001001(I)01010100(T)01010011(S)01010101(U)". The watermark-information obtaining unit 102 outputs the determined bit string to the fixed-length synchronization-flag generating unit 103.

The fixed-length synchronization-flag generating unit 103 generates a synchronization flag on the basis of the obtained watermark information. As a result, since the synchronization flag generated by the fixed-length synchronization-flag generating unit 103 varies depending on the watermark information, it is difficult to detect the synchronization flag unless the method for generating the synchronization method is known. The synchronization flag used in the first embodiment is assumed to have a fixed length, by way of example.

Figure 4:
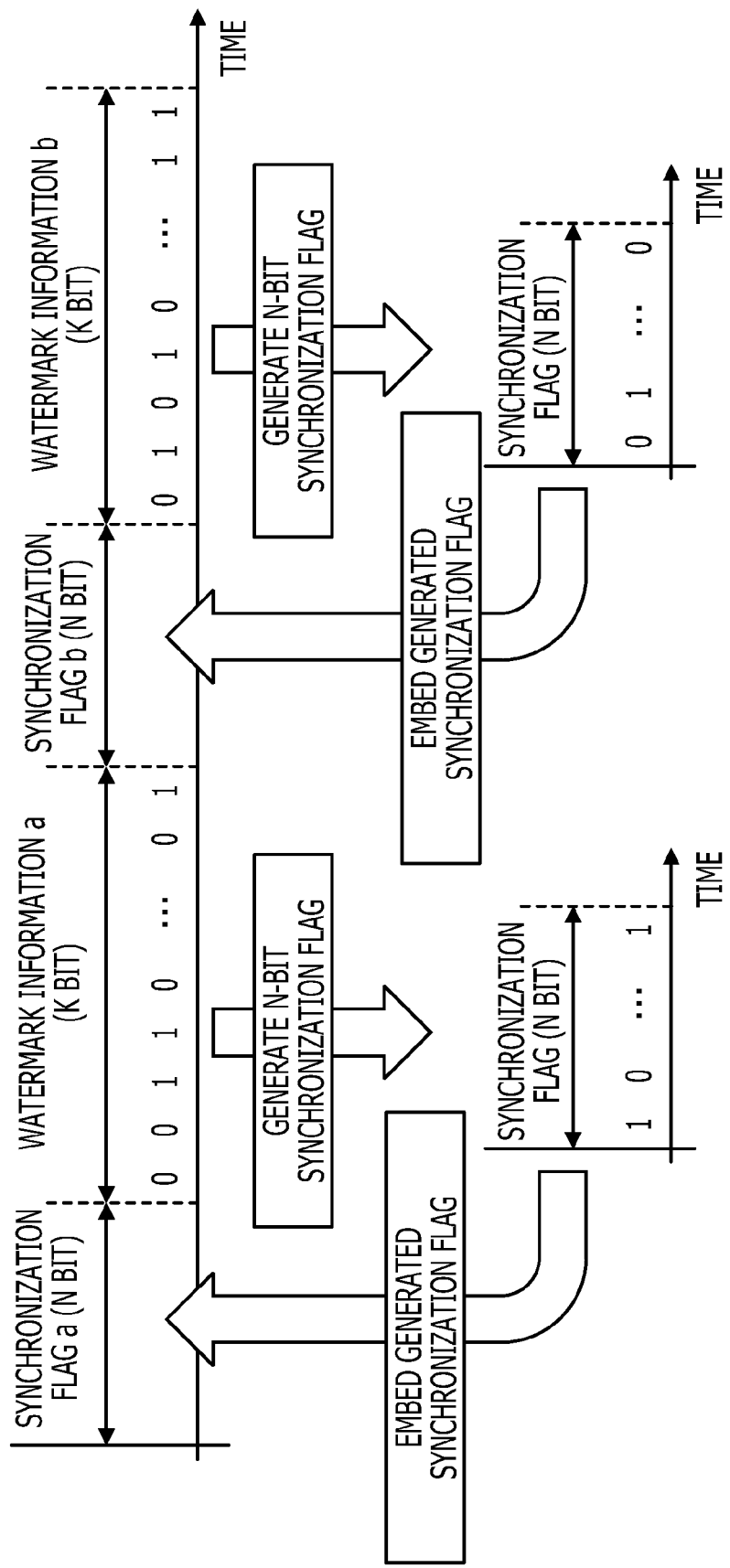
FIG. 4 is a diagram illustrating an example in which generated fixed-length synchronization flags are added prior to corresponding watermark information.

FIG. 4 is a diagram illustrating an example in which generated fixed-length synchronization flags are added prior to corresponding watermark information. In the example illustrated in FIG. 4, an N-bit synchronization flag is generated with respect to K-bit watermark information. For example, the fixed-length synchronization-flag generating unit 103 generates a synchronization flag a on the basis of watermark information a and generates a synchronization flag b on the basis of watermark information b. In the example illustrated in FIG. 4, the fixed-length synchronization-flag generating unit 103 adds the generated synchronization flags prior to the corresponding watermark information. The fixed-length synchronization-flag generating unit 103 may also add the synchronization flags subsequent to the corresponding watermark information.

Figure 5:
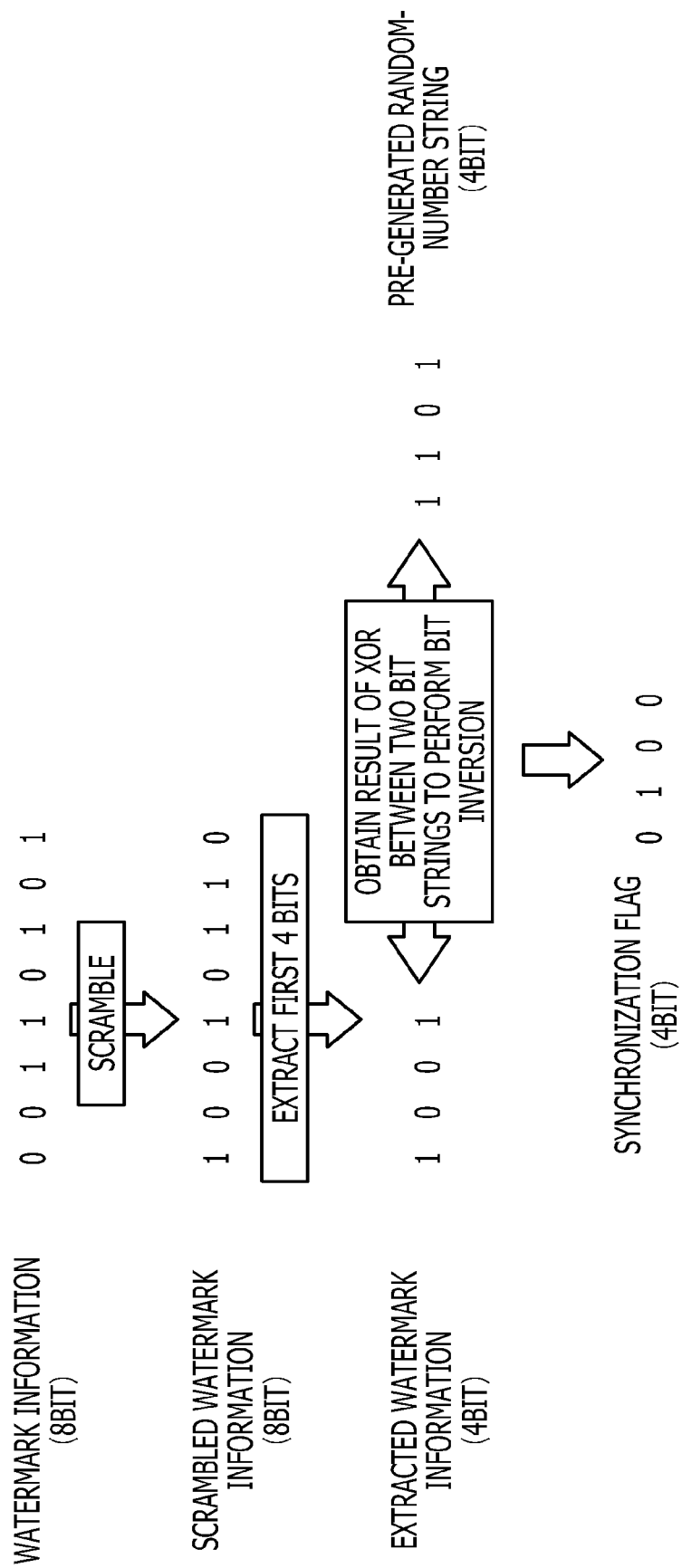
FIG. 5 illustrates one example of synchronization-flag generation processing (part 1)

Next, synchronization-flag generation processing will be described with reference to FIGS. 5 to 7. FIG. 5 illustrates one example of synchronization-flag generation processing (part 1). In the example illustrated in FIG. 5, a description is given of a case in which the watermark information has 8 bits and the synchronization flag has 4 bits.

The fixed-length synchronization-flag generating unit 103 scrambles the read watermark information. The scrambling is processing for interchanging the bits by using a random-number generator or the like. A seed for the random-number generator may have a fixed value or may have a value predetermined by an embedding side and a detecting side.

The fixed-length synchronization-flag generating unit 103 extracts 4 bits from the scrambled watermark information. While the first 4 bits are extracted in the example illustrated in FIG. 5, 4 bits may also be extracted from any other location predetermined by the embedding side and the detecting side.

Next, the fixed-length synchronization-flag generating unit 103 obtains a result of XOR (exclusive OR) between two bit strings, that is, the extracted 4-bit string and a prepared random-number string, to perform bit inversion. The bit-inverted 4 bits are used as a synchronization flag. Such processing allows a synchronization flag that is difficult to decipher to be generated using scrambling and XOR which are often used in cryptography.

The random-number string used in this case may be externally supplied or may be generated using a random-number generator or the like. However, since the detecting side also uses the same random-number string, the same random number string as that for the detecting side is also used similarly to the seed for the random-number generator used for the scrambling. When the detecting side does not know the seed and the random-number string, the position of the synchronization flag is undetectable. Thus, it is quite difficult to identify the position of the synchronization flag for, for example, a user who has no right to detect it.

Figure 6:
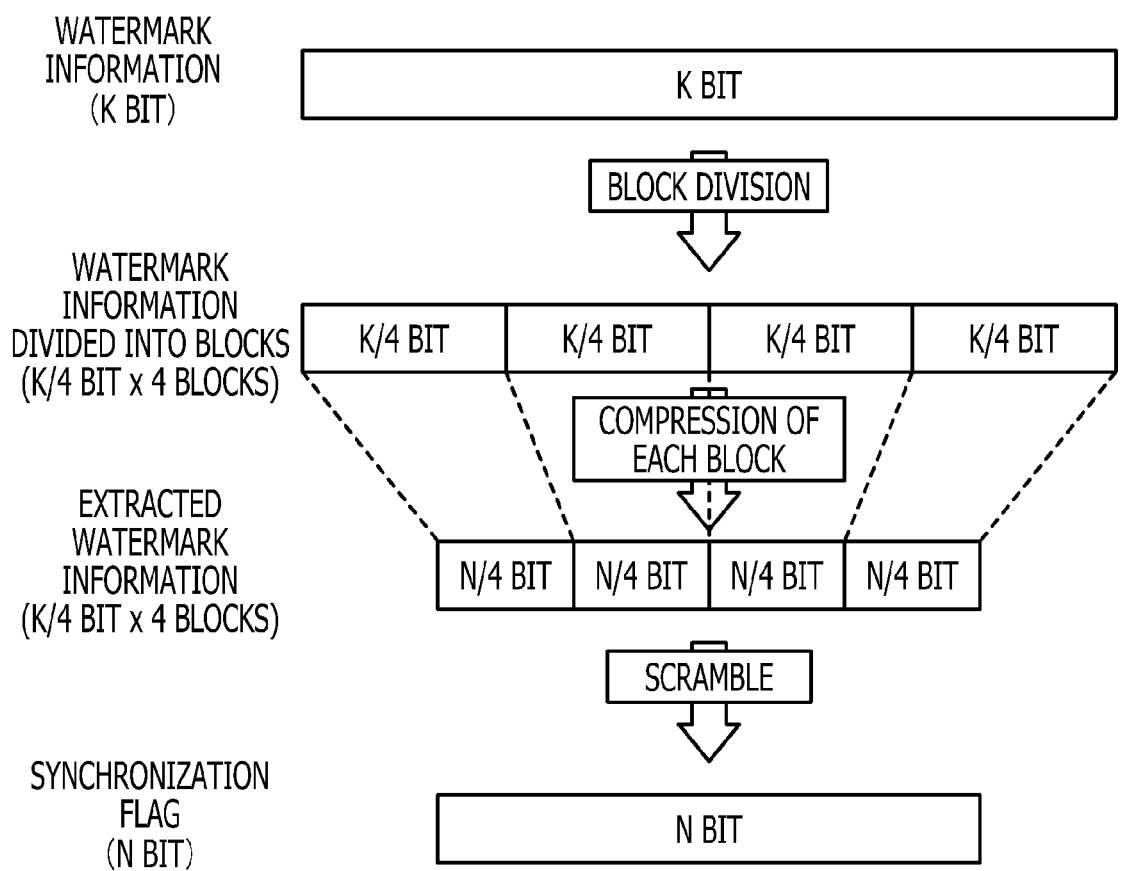
FIG. 6 illustrates one example of synchronization-flag generation processing (part 2)

FIG. 6 illustrates one example of synchronization-flag generation processing (part 2). In the example illustrated in FIG. 6, the fixed-length synchronization-flag generating unit 103 divides K-bit watermark information into blocks. In the example illustrated in FIG. 6, the watermark information is divided into four blocks.

Next, the fixed-length synchronization-flag generating unit 103 performs compression processing on the watermark information in each K/4-bit block of the divided blocks. The compression processing is performed so that K/4 bits become N/4 bits. The fixed-length synchronization-flag generating unit 103 extracts, for example, N/4 bits from a predetermined position in K/4 bits.

The predetermined position is, for example, a sequence of N/4 bits from the front or end of K/4 bits.

Next, the fixed-length synchronization-flag generating unit 103 combines four compressed N/4-bit blocks together and scrambles the combined N-bit information. The fixed-length synchronization-flag generating unit 103 sets the scrambled N-bit information as a synchronization flag.

Figure 7:
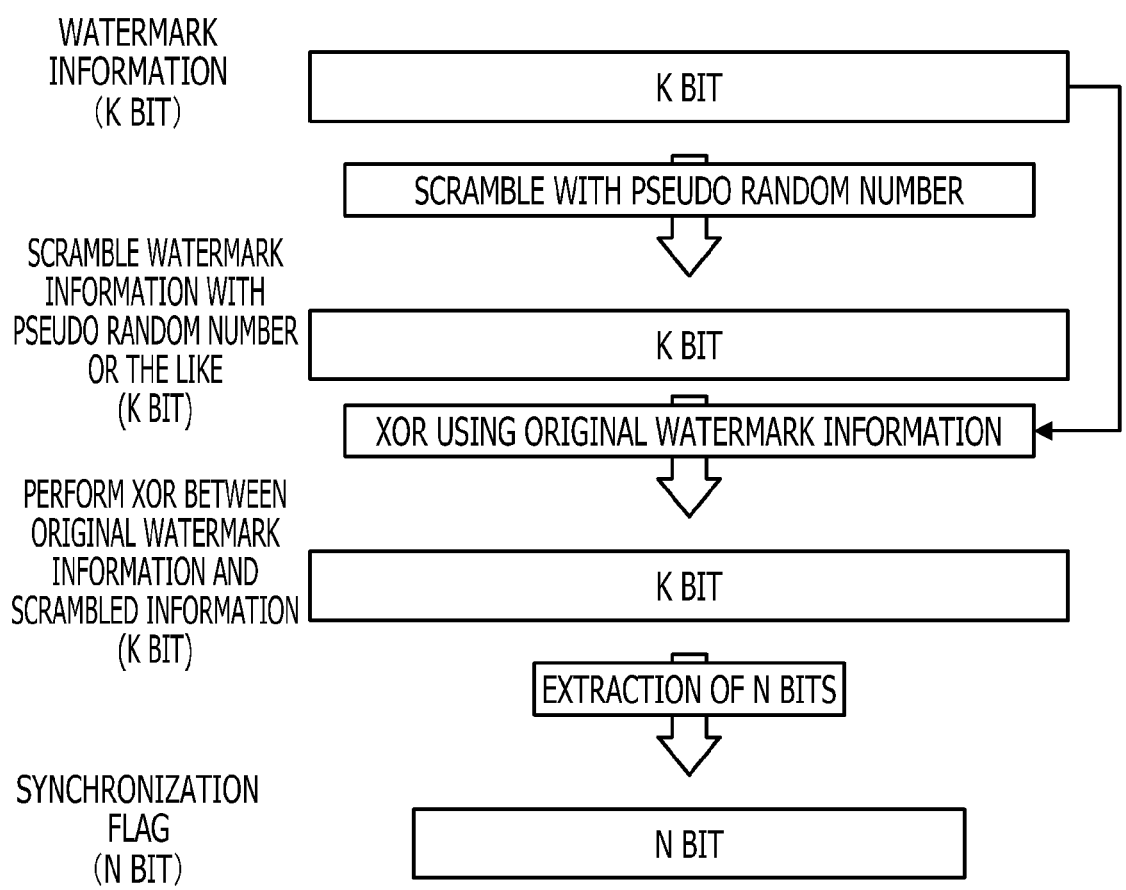
FIG. 7 illustrates one example of synchronization-flag generation processing (part 3)

FIG. 7 illustrates one example of synchronization-flag generation processing (part 3). In the example illustrated in FIG. 7, first, the fixed-length synchronization-flag generating unit 103 scrambles Kbit watermark information by using a pseudo-random number.

Next, the fixed-length synchronization-flag generating unit 103 performs an exclusive-OR (XOR) operation between the original Kbit watermark information and the scrambled Kbit information.

Next, the fixed-length synchronization-flag generating unit 103 extracts N bits from a predetermined position in the XORed Kbit information. The fixed-length synchronization-flag generating unit 103 sets the extracted N-bit information as a synchronization flag.

As described above, by using the methods illustrated in FIGS. 5 to 7, the fixed-length synchronization-flag generating unit 103 can generate an N-bit synchronization flag on the basis of Kbit watermark information. The synchronization-flag generation processing, however, is not limited to the methods illustrated in FIGS. 5 to 7, and is also realized by any reversible encoding method. The fixed-length synchronization-flag generating unit 103 adds the generated synchronization flag, for example, prior to the original watermark information.

The fixed-length synchronization-flag generating unit 103 outputs the synchronization-flag-added watermark information to the embedding unit 104.

The embedding unit 104 obtains the synchronization-flag-added watermark information from the fixed-length synchronization-flag generating unit 103 and embeds the synchronization-flag-added watermark information into content, such as image data or audio data, as a digital watermark. This synchronization-flag-added watermark information may hereinafter be referred to as "first watermark information". The content is obtained from the content obtaining unit 101. For embedding the first watermark information, the embedding unit 104 may use any of various methods for embedding watermark information corresponding to content.

For example, when the content is audio data, the embedding unit 104 embeds the first watermark information into a human inaudible range. In this case, the embedding unit 104 generates signals corresponding to the values of bits contained in the first watermark information. The embedding unit 104 then superimposes the signals corresponding to the values of the bits onto an inaudible range in sequence starting from the first bit in the first watermark information.

When the content is moving-image data, the embedding unit 104 embeds the bits into multiple time-sequentially arranged images, contained in the moving-image data, one-by-one in sequence starting from the first bit in the first watermark information. For example, the embedding unit 104 converts luminance values of pixels at respective predetermined positions in the images into luminance values corresponding to the values of the bits in sequence starting from the first bit in the first watermark information. The predetermined position may be a pixel at one of four corners of each image.

A preferable scheme for a digital watermark will be described below. Embedded digital watermarks could be lost through data compression or extraction, filter processing, camera photography, or the like. Accordingly, with respect to a prerequisite for digital watermarks in security systems, it is desirable to provide resistance to those possible causes of the digital-watermark loss.

One example of a digital-watermark scheme that satisfies the prerequisite is a scheme in which two types of pattern whose area varies in a time direction are prepared and the two types of pattern are superimposed in the time direction while being switched according to information to be embedded.

Figure 8:
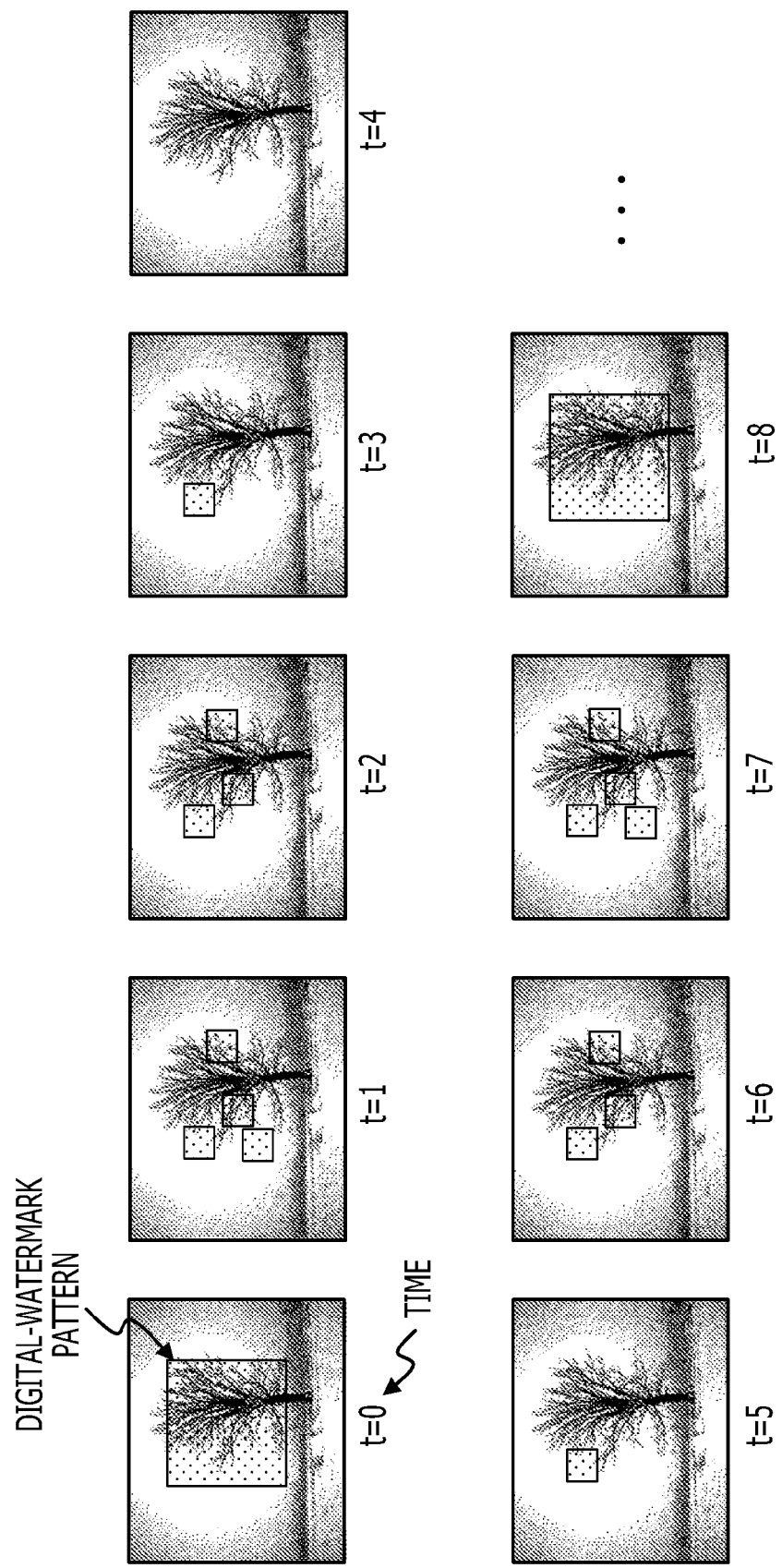
FIG. 8 illustrates one example of a digital-watermark scheme.

FIG. 8 illustrates one example of a digital-watermark scheme. In the example illustrated in FIG. 8, frames of a moving image are arranged in the time direction and a digital-watermark pattern is superimposed on each of the frames. The digital-watermark pattern is, for example, a pattern obtained by reducing the luminance of the pixels in the original image to values in a range that is not perceivable by human vision.

The area of the digital-watermark pattern illustrated in FIG. 8 varies in the time direction. For example, the area of the digital-watermark pattern at t=0 is 100%, the area then decreases gradually, and the area at t=4 reaches 0%. As time progresses further, the area increases gradually, and at t=8, the area reaches 100%, which is the same as the area at t=0. The brightness of the entire image varies according to a change in the area of the digital-watermark pattern.

Figure 9A:
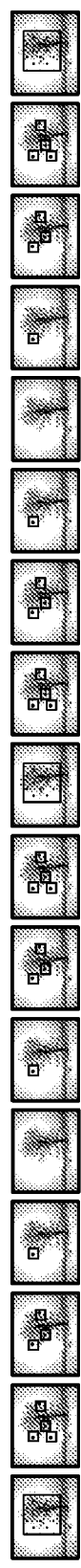
FIGS. 9A to 9C illustrate changes in an image.
Figure 9B:
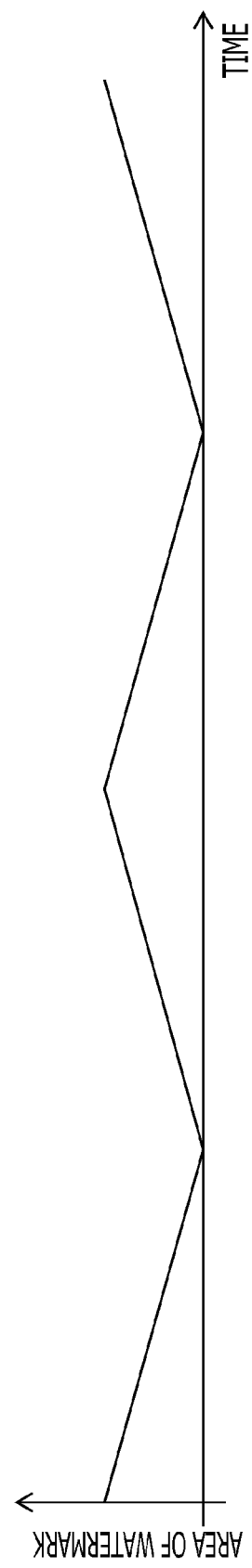
Figure 9C:
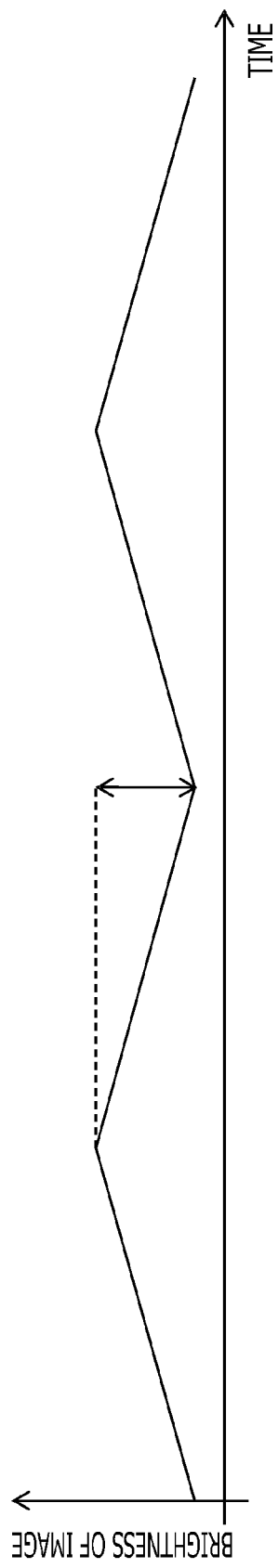

FIGS. 9A to 9C illustrate changes in the image. FIG. 9A illustrates changes in the digital-watermark pattern. FIG. 9B is a graph depicting changes in the area corresponding to FIG. 9A. In the graph depicted in FIG. 9B, the vertical axis indicates the area of the watermark pattern and the horizontal axis indicates time. FIG. 9C is a graph depicting changes in the brightness of the image corresponding to FIG. 9A. In the graph depicted in FIG. 9C, the vertical axis indicates the brightness of the image and the horizontal axis indicates time.

Figure 10A:
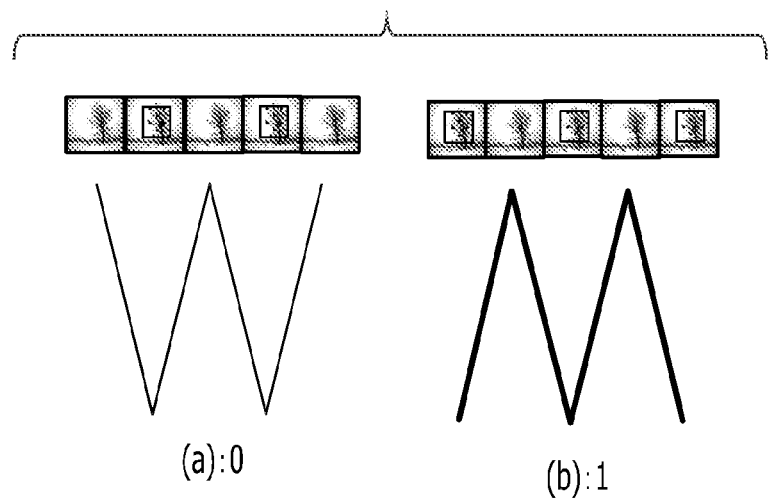
FIGS. 10A and 10B illustrate one example of two types of digital-watermark pattern.
Figure 10B:
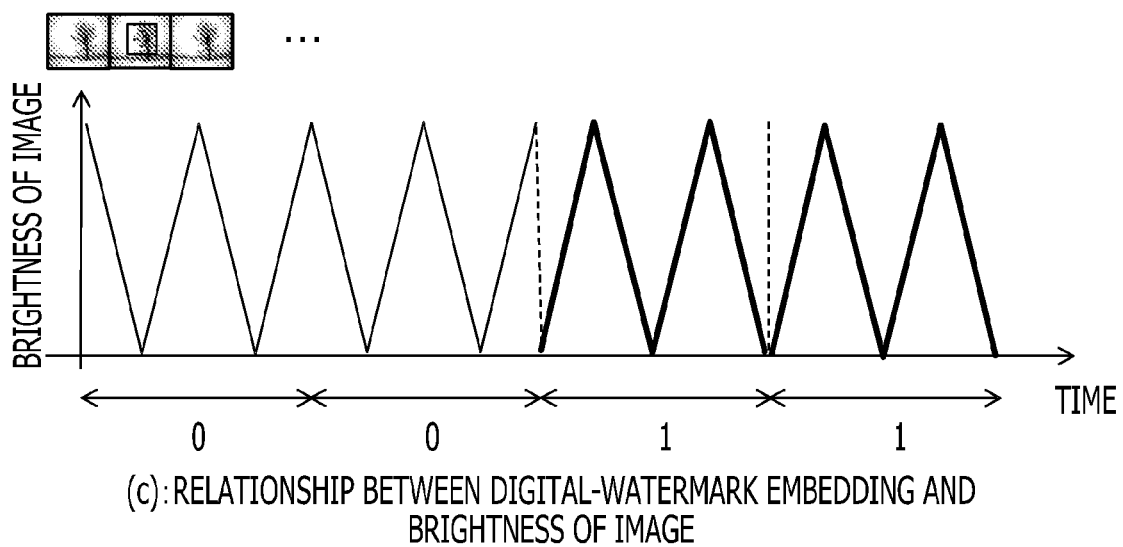

As depicted in FIGS. 9B and 9C, the brightness of the digital-watermark pattern is the lowest when the area of the digital-watermark pattern is 100% and is the highest when the area of the digital-watermark pattern is 0%. FIGS. 10A and 10B illustrate an example in which the phase of the digital-watermark pattern having the varying area is varied to generate two types of digital-watermark pattern.

FIG. 10A illustrate merely one example of two types of digital-watermark pattern. In the example illustrated in FIG. 10A, the area of one digital-watermark pattern (a) varies in the order of 0%, 100%, 0%, 100%, and 0%, to thereby indicate "0". The area of another digital-watermark pattern (b) varies in the order of 100%, 0%, 100%, 0%, and 100%, to thereby indicate "1".

That is, the phases of the two digital-watermark patterns are different from each other by 180°. For example, when information "0011" is to be embedded, the embedding unit 104 sequentially superimposes two digital-watermark patterns (a) indicating "0" (illustrated in FIG. 10A) in the time direction and then sequentially superimposes two digital-watermark patterns (b) indicating "1" (illustrated in FIG. 10A), as illustrated in FIG. 10B.

For detection, the average of the pixel values of each frame of video in which the information is embedded is determined, Fourier transform is performed on the waveform of average-value changes in the time direction, and then the phase is determined from a Fourier coefficient of a signal having the same period as the embedded digital-watermark pattern.

Since the signals having two types of phase that are different from each other by 180° are detected from the video in which the information is embedded, the embedded information is detected by allocating information of "0" and "1" to the different-phase signals. Since the embedded information is distributed in the time direction, this scheme provides high resistance to data compression or extraction, filter processing, camera photography, and so on.

The embedding unit 104 embeds the watermark information having the synchronization flag, generated by the fixed-length synchronization-flag generating unit 103, into a moving image in the time direction. The two types of digital-watermark pattern illustrated in FIG. 10A are prepared and the embedding unit 104 superimposes the two types of digital-watermark pattern onto the frames of the moving image while switching between the two types of digital-watermark pattern so as to correspond to the sequence of the bits of the first watermark information.

As a specific method for combining two patterns with the frames, the embedding unit 104 may employ a method for adding a watermark pattern to an original frame, as indicated by equation (1).

$$X' = X + bW \quad (1)$$

where X indicates the input original frame, W indicates the digital-watermark pattern, X' indicates a frame obtained by adding the digital-watermark pattern to the original frame, and b indicates a watermark intensity.

As the value of b increases, the influence of W increases. Thus, the resistance of the digital watermark increases, but image-quality deterioration due to the digital watermark also increases. Conversely, as the value of b decreases, the influence of W decreases. Thus, the resistance of the digital watermark decreases but image-quality deterioration due to the digital watermark also decreases. The pattern combination may also be implemented by another combination method using alpha blending represented in equation (2).

$$X' = (1-\alpha)X + \alpha W \quad (2)$$

where X indicates the input original frame, W indicates the digital-watermark pattern, X' indicates a frame obtained by combining two patterns with the original frame, and α indicates a combination rate having a value of 0 to 1.

As the value of α increases, the rate of W increases. Thus, the resistance of the digital watermark increases, but image-quality deterioration due to the digital watermark also increases. Conversely, as the value of α decreases, the influence of W decreases. Thus, the resistance of the digital watermark decreases but image-quality deterioration due to the digital watermark also decreases.

The embedding unit 104 may employ various watermark embedding methods, as described above. In the present embodiment, the method for embedding the watermark into content is not particularly limiting and various types of method can be used.

With the configuration described above, watermark information to which a synchronization flag determined based on the watermark information can be embedded into content.

Figure 11:
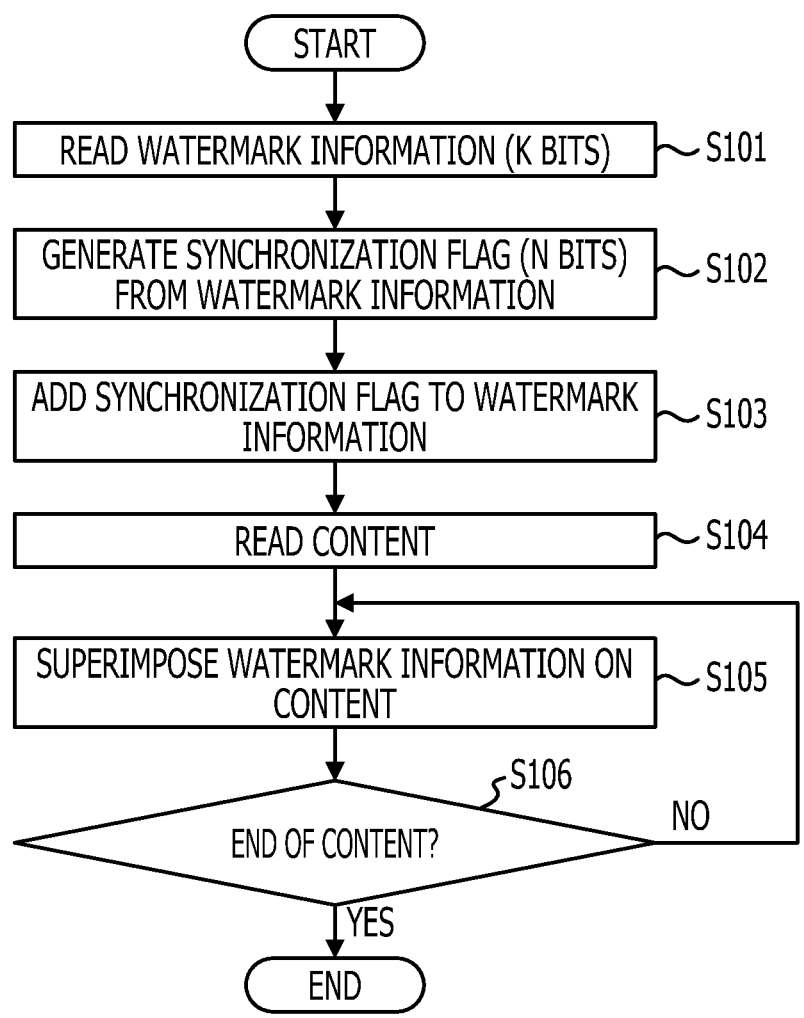
FIG. 11 is a flowchart illustrating one example of digital-watermark embedding processing in the first embodiment.

Next, a description will be given of an operation of the digital-watermark embedding device in the first embodiment. FIG. 11 is a flowchart illustrating one example of digital-watermark embedding processing in the first embodiment. In step S101 illustrated in FIG. 11, the watermark-information obtaining unit 102 reads and obtains watermark information from, for example, the auxiliary storage unit 30. The watermark information has, for example, K bits.

In step S102, the fixed-length synchronization-flag generating unit 103 generates a synchronization flag (N bits) on the basis of the watermark information (K bits) obtained from the watermark-information obtaining unit 102. For example, any of the methods illustrated in FIGS. 5 to 7 may be preset as a method for generating the synchronization flag.

In step S103, the fixed-length synchronization-flag generating unit 103 adds the generated synchronization flag prior to or subsequent to the original watermark information.

In step S104, the content obtaining unit 101 reads and obtains content from, for example, the auxiliary storage unit 30. The content is, for example, a moving image. Steps S101 to S103 and steps S104 may be processed in random order.

In step S105, the embedding unit 104 superimposes the synchronization-flag-added watermark information on each predetermined one of units of content. For example, when the content is a moving image, the embedding unit 104 embeds the digital-watermark pattern (see FIG. 10A), based on the synchronization-flag-added watermark information, into each frame of the moving image.

In step S106, the embedding unit 104 determines whether or not the end of the content is reached. When the end of the content is reached (YES in step S106), the embedding processing is finished. When the end of the content is not reached (NO in step S106), the process returns to step S105.

According to the first embodiment, the fixed-length synchronization flag is generated based on the digital-watermark information, to thereby make it difficult to detect the synchronization flag and to make it possible to enhance security. In addition, since the synchronization flag does not have a fixed value and varies depending on the watermark information, it is quite difficult to detect the synchronization flag for a person who does not know the method for generating it. As a result, for example, the risk of falsification of the watermark information can be reduced.

An information processing device in the second embodiment will be described next. The information processing device in the second embodiment functions as a digital-watermark embedding device. In the second embodiment, a variable-length synchronization flag is generated based on digital-watermark information.

Since the configuration of the information processing device in the second embodiment is similar to the information processing device 1 in the first embodiment, a description thereof will not be given hereinafter. Units in the information processing device in the second embodiment are described using the same reference numerals as those illustrated in FIG. 2.

Figure 12:
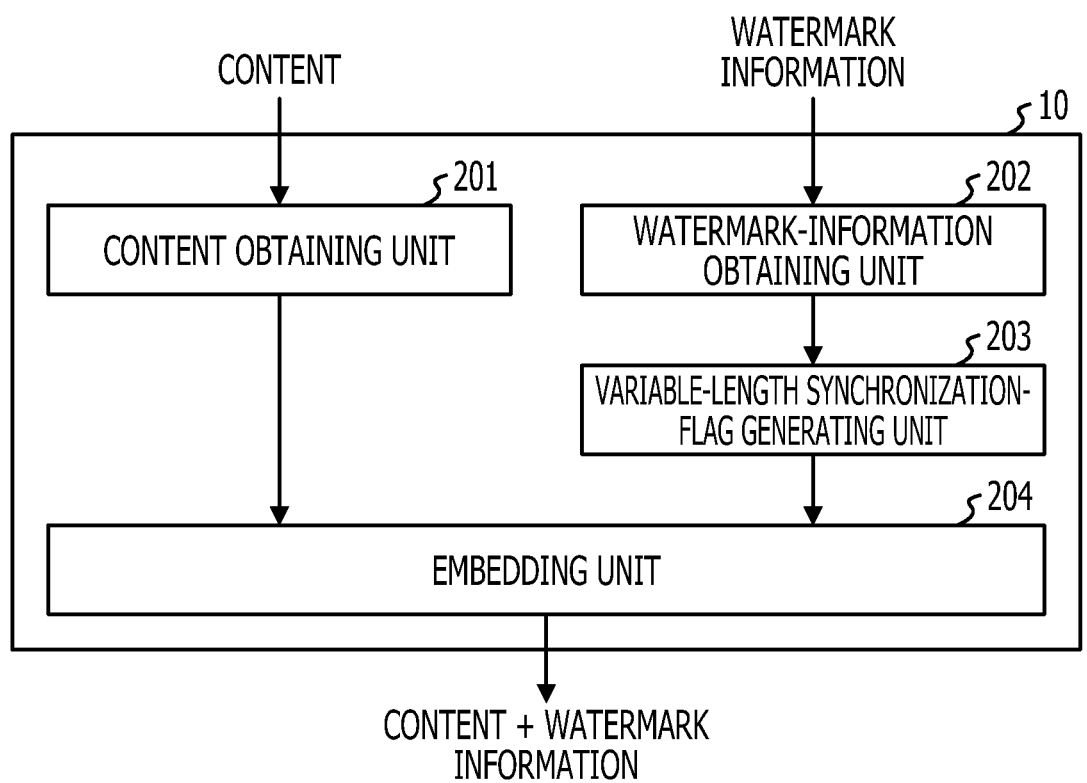
FIG. 12 is a block diagram illustrating one example of a digital-watermark embedding function in a second embodiment.

A control unit 10 having a digital-watermark-information embedding function will be described next in detail. FIG. 12 is a block diagram illustrating one example of a digital-watermark embedding function in the second embodiment. The control unit 10 illustrated in FIG. 12 includes a content obtaining unit 201, a watermark-information obtaining unit 202, a variable-length synchronization-flag generating unit 203, and an embedding unit 204. In this example, since the content obtaining unit 201, the watermark-information obtaining unit 202, and the embedding unit 204 performs processing that is similar to the processing of the content obtaining unit 101, the watermark-information obtaining unit 102, and the embedding unit 104 in the first embodiment, descriptions thereof are not given hereinafter.

The variable-length synchronization-flag generating unit 203 generates a variable-length synchronization flag on the basis of obtained watermark information and adds the generated synchronization flag prior to or subsequent to the watermark information.

Figure 13:
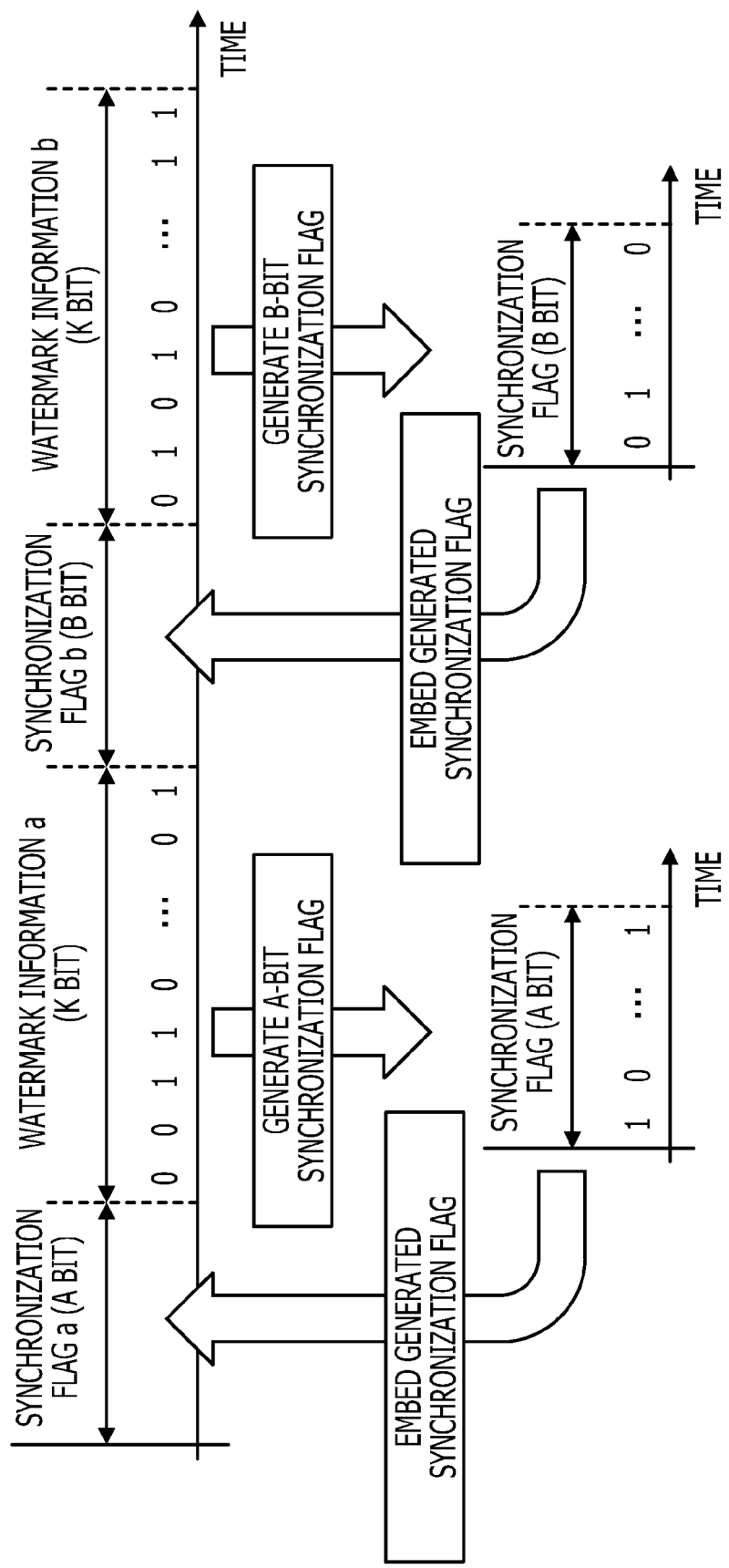
FIG. 13 is a diagram illustrating an example in which generated variable-length synchronization flags are added prior to corresponding watermark information.

FIG. 13 is a diagram illustrating an example in which generated variable-length synchronization flags are added prior to corresponding watermark information. In the example illustrated in FIG. 13, a T-bit synchronization flag (T is variable) is generated with respect to K bit watermark information. For example, the variable-length synchronization-flag generating unit 203 generates an A-bit synchronization flag a on the basis of watermark information a and generates a B-bit synchronization flag b on the basis of watermark information b, where A and B are arbitrary values.

In the example illustrated in FIG. 13, the variable-length synchronization-flag generating unit 203 adds the generated synchronization flags prior to the corresponding watermark information. The variable-length synchronization-flag generating unit 203 may also add the synchronization flags subsequent to the corresponding watermark information.

Figure 14:
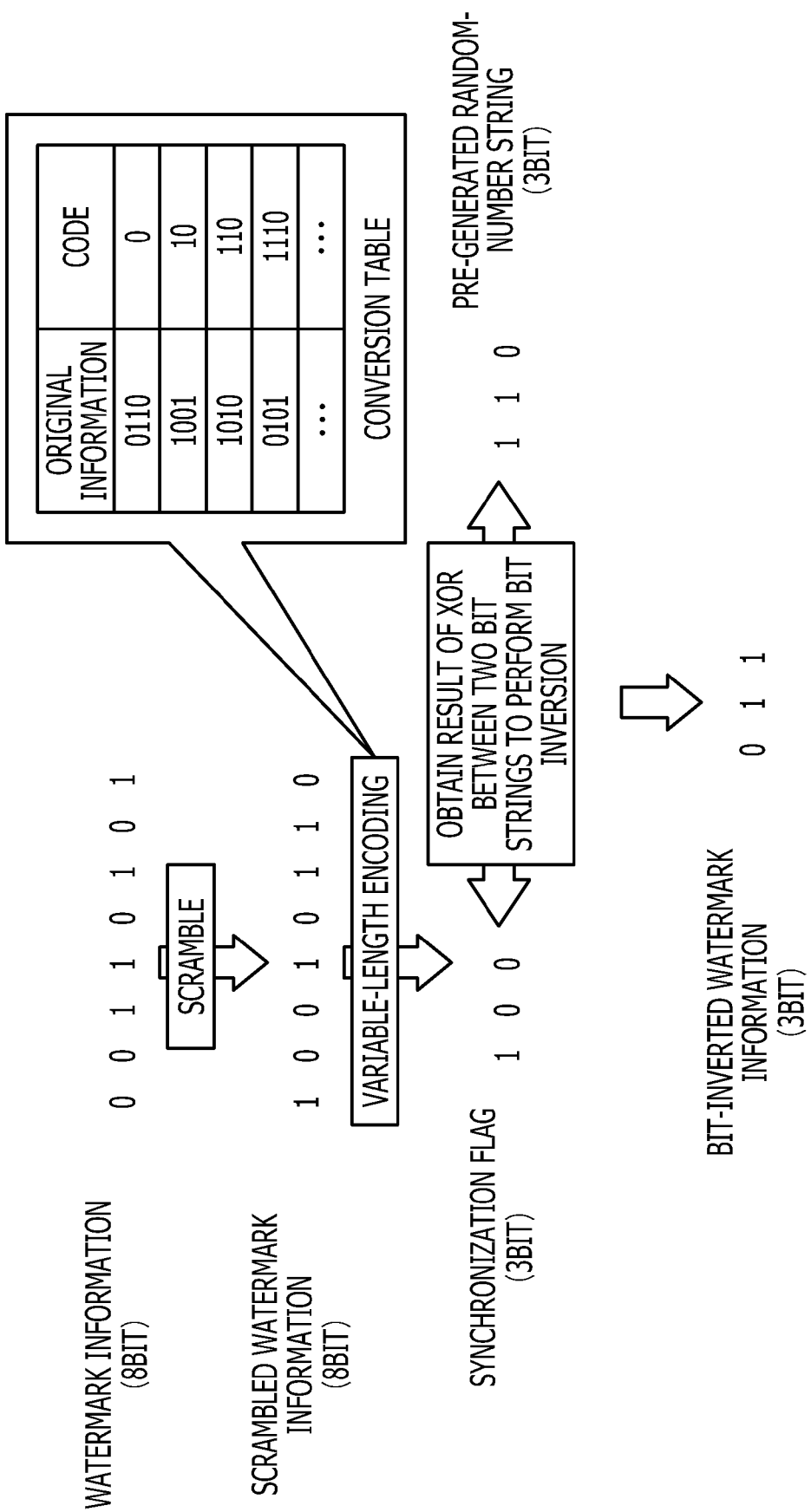
FIG. 14 illustrates one example of synchronization-flag generation processing (part 4)

Next, variable-length synchronization-flag generation processing will be described with reference to FIG. 14. FIG. 14 illustrates one example of synchronization-flag generation processing (part 4). In the example illustrated in FIG. 14, a description is given of a case in which the watermark information has 8 bits.

First, the variable-length synchronization-flag generating unit 203 scrambles the read watermark information. The scrambling is processing for interchanging the bits by using a random-number generator or the like. A seed for the random-number generator may have a fixed value or may have a value predetermined by an embedding side and a detecting side.

The variable-length synchronization-flag generating unit 203 performs variable-length encoding on the scrambled watermark information. The variable-length encoding refers to a technology for changing a code length by performing processing for replacing the original information with other code, as in Huffman coding or run-length coding, and is often used for information compression and so on.

In the second embodiment, a conversion table as in Huffman coding is prepared and processing for replacing original information with other code is performed according to the conversion table. In the Huffman coding, a Huffman tree is generated from the original information and the conversion table is dynamically generated based on the appearance frequency of information, to thereby enhance the compression efficiency.

However, when the conversion table is dynamically generated each time watermark information is embedded, the generated conversion table varies depending on the embedded watermark information. In this case, it is not practical to pass the generated conversion table to the detecting side for information detection.

Accordingly, a description in the second embodiment will be given of an example in which variable-length encoding is performed using a fixed conversion table. For example, when the scrambled watermark information is "10010110", this bit string is sectioned by a predetermined length. In this case, it is assumed that the bit string is sectioned by 4 bits.

By using a conversion table illustrated in FIG. 14, the variable-length synchronization-flag generating unit 203 replaces bit strings of the first-half portion "1001" and the last-half portion "0110" with other codes. As a result, the first-half portion indicates "10" and the last-half portion indicates "0". Thus, when these values are returned to a single bit string, information "100", which is 3 bits, is obtained. When the watermark information varies, the length resulting from the encoding varies. For example, when the watermark information is "01011010", the result of the conversion is "1110110", which is 7 bits.

Next, the variable-length synchronization-flag generating unit 203 obtains a result of XOR between two bit strings, that is, the variable-length encoded watermark information and a prepared random-number string to perform bit inversion. The bit-inverted bit string is used as a synchronization flag. Such processing allows a variable-length synchronization flag that is difficult to decipher to be generated using scrambling and/or XOR which are often used in cryptography.

The random-number string used in this case may be externally supplied or may be generated using a random-number generator or the like. However, since the detecting side also uses the same random-number string, the same random number string as that for the detecting side is also used similarly to the seed for the random-number generator used for the scrambling. When the detecting side does not know the seed and the random-number string, the position of the synchronization flag is undetectable. Thus, it is quite difficult to identify the position of the synchronization flag for, for example, a user who has no right to detect it. In addition, since the synchronization flag has a variable length, this scheme makes it more difficult to identify the position of the synchronization flag.

The above-described method makes it possible to generate a variable-length synchronization flag on the basis of Kbit watermark information. However, the method for generating a viable-length synchronization flag is not limited to the above-described method and can also be realized with a reversible encoding method. In the example illustrated in FIG. 13, the variable-length synchronization-flag generating unit 203 adds the generated variable-length synchronization flags prior to the corresponding watermark information.

Figure 15:
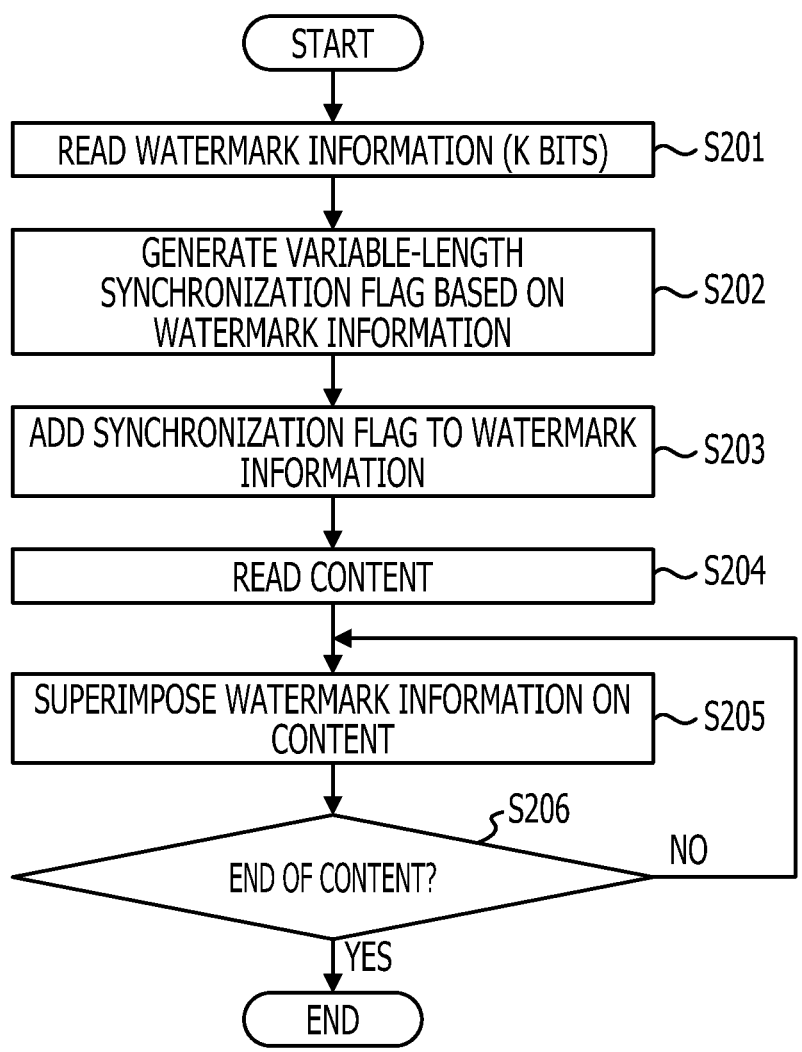
FIG. 15 is a flowchart illustrating one example of digital-watermark embedding processing in the second embodiment.

Next, a description will be given of an operation of the digital-watermark embedding device according to the second embodiment. FIG. 15 is a flowchart illustrating one example of digital-watermark embedding processing in the second embodiment. Since processing in steps S201 and S203 to S206 illustrated in FIG. 15 is similar to the processing in steps S101 and S103 to S106 illustrated in FIG. 11, a description thereof is not given hereinafter.

In step S202, the variable-length synchronization-flag generating unit 203 generates a variable-length synchronization flag on the basis of the watermark information (K bits) obtained from the watermark-information obtaining unit 202. For example, the method illustrated in FIG. 14 may be used as a method for generating the variable-length synchronization flag.

According to the second embodiment described above, the variable-length synchronization flag is generated based on the digital-watermark information, to thereby make it difficult to detect the synchronization flag and to make it possible to enhance security. In addition, since the synchronization flag does not have a fixed value and the value and the length of the synchronization flag vary depending on the watermark information, it is quite difficult to detect the synchronization flag for a person who does not know the method for generating it. As a result, for example, the risk of falsification of the watermark information can be reduced.

An information processing device 5 according to a third embodiment will be described next. The information processing device 5 in the third embodiment functions as a digital-watermark detecting device. In the third embodiment, digital-watermark information embedded in the first and second embodiments is detected.

Since the configuration of the information processing device 5 in the third embodiment is similar to the information processing device 1 in the first embodiment, a description thereof will not be given hereinafter. Units in the information processing device in the third embodiment are described using the same reference numerals as those illustrated in FIG. 2.

Figure 16:
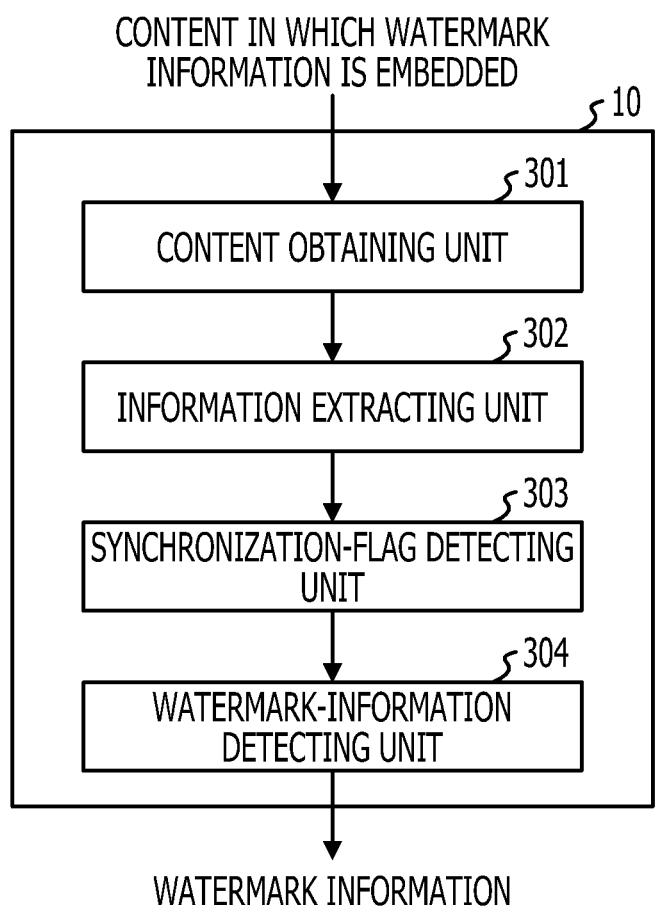
FIG. 16 is a block diagram illustrating one example of a digital-watermark detection function in a third embodiment.

A control unit 10 having a digital-watermark-information detection function will be described next in detail. FIG. 16 is a block diagram illustrating one example of a digital-watermark detection function in the third embedment.

The control unit 10 illustrated in FIG. 16 includes a content obtaining unit 301, an information extracting unit 302, a synchronization-flag detecting unit 303, and a watermark-information detecting unit 304.

The content obtaining unit 301 obtains, from a moving-image sharing site or the like, content in which watermark information is embedded. The content obtaining unit 301 outputs the obtained content to the information extracting unit 302.

The information extracting unit 302 detects a bit string embedded in the content. For example, by using a detection method corresponding to the digital-watermark embedding method in the first or second embodiment, the information extracting unit 302 detects the bits of multiple pieces of watermark information embedded in the content.

For example, it is assumed that the content is audio data and signals corresponding to the values of the bits contained in the watermark information are added to an inaudible range in the audio data. In this case, the information extracting unit 302 performs template matching between a template for the signals and the signals in the inaudible range to thereby detect signals that matches the template in the inaudible range. The information extracting unit 302 detects bit values corresponding to the matched template as bits contained in the watermark information.

When the content is moving-image data and predetermined pixels in images of the moving-image-data have values corresponding to the bit values contained in the watermark information, the information extracting unit 302 detects bit values corresponding to the values of the predetermined pixels. The information extracting unit 302 outputs the extracted bit string to the synchronization-flag detecting unit 303.

When the obtained content is a moving image and watermark information is embedded using the embedding method described above with reference to FIGS. 8 to 10, the information extracting unit 302 determines the average of the pixel values of each frame and performs Fourier transform on a waveform of the pixel-value average in the time direction.

The information extracting unit 302 determines a phase with respect to signals having the same cycle as the embedded pattern, on the basis of a Fourier coefficient determined by the Fourier transform. When Fourier transform is performed on a moving image in which a watermark is embedded, signals having two phases that are different from each other by 180° are detected based on changes in the phase with time. The two phases that are different from each other by 180° correspond to "0" and "1" of the embedded digital-watermark patterns, respectively.

Thus, the information extracting unit 302 detects an embedded bit string by allocating "0" and "1" to the signals having the respective phases.

The synchronization-flag detecting unit 303 identifies the position of the synchronization flag, that is, the beginning of the embedded information, from the bit string extracted by the information extracting unit 302. A specific method will now be described next with reference to FIG. 17.

Figure 17:
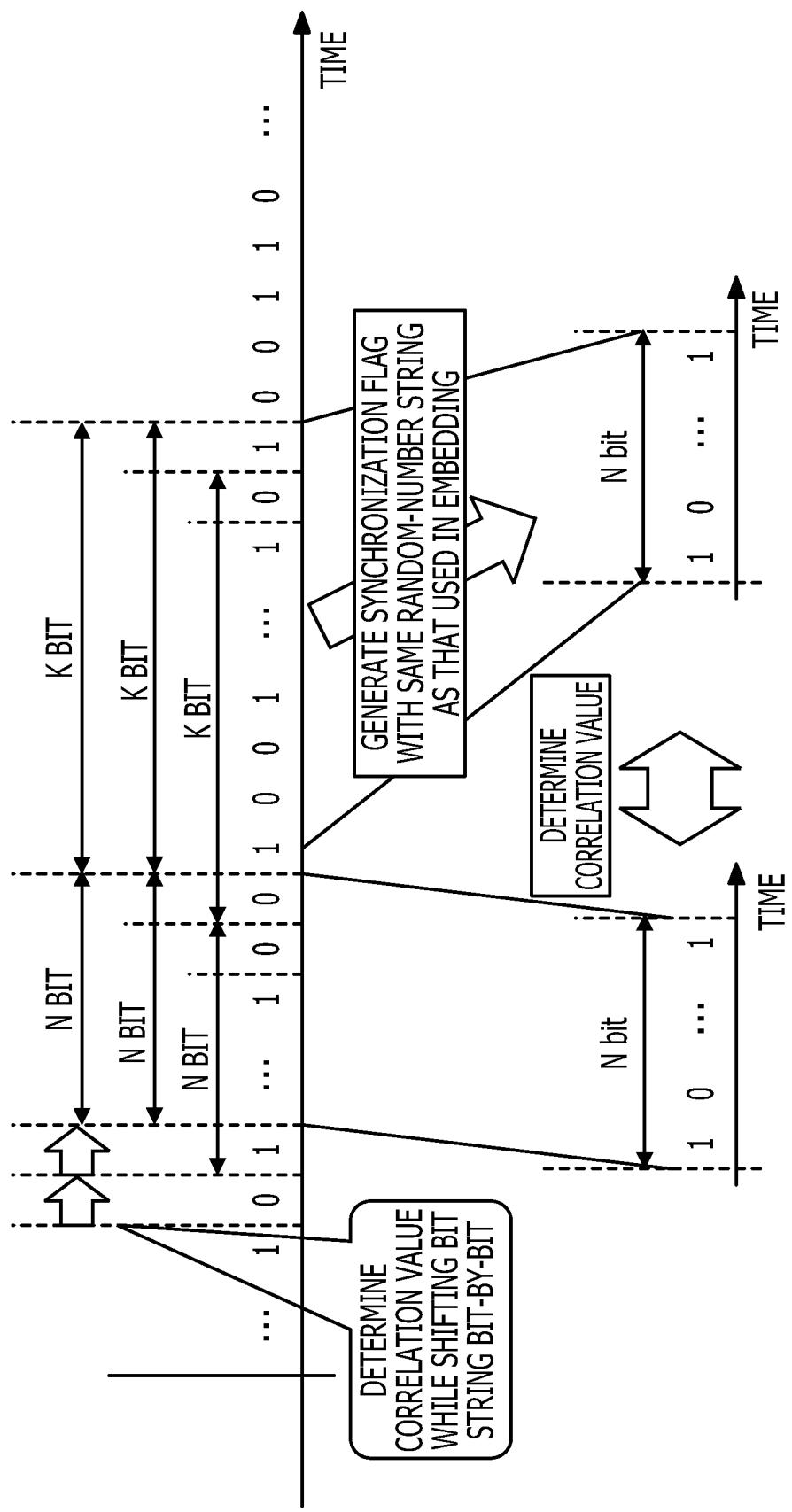
FIG. 17 is a diagram illustrating a synchronization-flag detection method.

FIG. 17 is a diagram illustrating a synchronization-flag detection method. In the example illustrated in FIG. 17, by using the same method as the method in the first embodiment, the synchronization-flag detecting unit 303 generates a synchronization flag on the basis of Kbit information while shifting a detected bit string bit-by-bit from the first bit of the bit string.

A seed for the random-number generator used for generating the synchronization flag and a random-number string have the same values as those used in the embedment. The values correspond to a key in a cryptographic technology.

Thus, it is quite difficult to identify the position of the synchronization flag for a person who does not know the key.

The synchronization-flag detecting unit 303 determines a correlation value between a synchronization flag (N bits) generated from a bit string of K bits and N bits immediately prior to the K bits. Letting the synchronization flag generated from the Kbit bit string be X={$x_1, x_2, \ldots, x_N$} and letting the N-bit bit string immediately prior to the Kbit bit string be Y={$y_1, y_2, \ldots, y_N$}, the correlation value can be calculated based on equation (3).

$$\text{CORRELATION VALUE} = \frac{1}{N}\sum_{i=1}^{N}(2x_1-1)\times(2y_1-1) \quad (3)$$

When the correlation value is calculated while shifting the bit string bit-by-bit, the correlation value at the position at which the synchronization flag is embedded is the largest since the synchronization flag generated from the K-bit bit string and the N-bit bit string immediately prior to Kbits have the same value.

Figure 18:
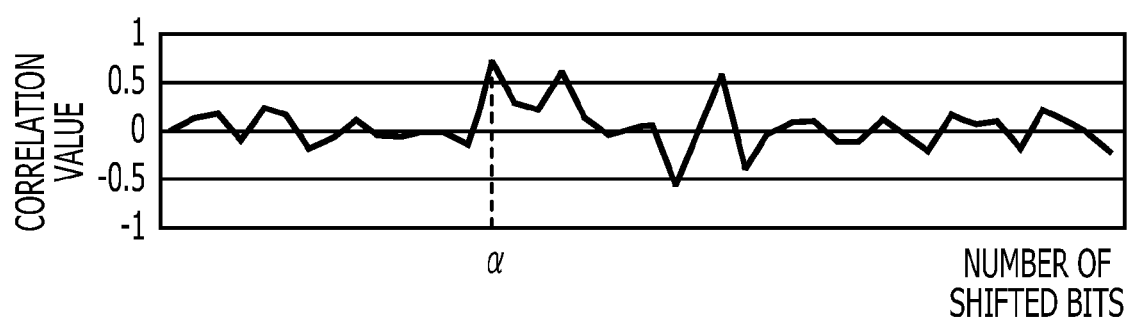
FIG. 18 is a graph depicting a correlation value when a bit string is shifted bit-by-bit by K+N bits.

FIG. 18 is a graph depicting a correlation value when a bit string is shifted bit-by-bit by K+N bits. The vertical axis indicates the correlation value and the horizontal axis indicates the number of shifted bits. In the example illustrated in FIG. 18, since the correlation value at the position a is the largest, the synchronization-flag detecting unit 303 determines that the position shifted by a bits is the position of the synchronization flag. This means that the synchronization-flag detecting unit 303 has identified the beginning of the embedded watermark information, thereby detecting the embedded watermark information.

Upon detecting the position of a first synchronization flag, the synchronization-flag detecting unit 303 determines the degree of similarity between the synchronization flag generated from K bits and N bits immediately prior to the K bits while shifting the bit string bit-by-bit by K+N bits to thereby detect second and subsequent synchronization flags. When the degree of similarity is higher than or equal to a threshold, the synchronization-flag detecting unit 303 detects the N-bit portion as a synchronization flag.

Considering bit loss and so on, the synchronization-flag detecting unit 303 may be configured so that it shifts the bit string forward or backward bit-by-bit by a few or several bits after shifting the bit string by K+N bits and then detects the synchronization flag by performing similar similarity-degree calculation.

For detecting the variable-length synchronization flag in the second embodiment, the synchronization-flag detecting unit 303 may generate the variable-length synchronization flag, described in the second embodiment, from K bits and determine the degree of similarly between the synchronization flag and a bit string that is located immediately prior to the K bits and that has the same number of bits as the number of bits of the synchronization flag. In other processing, the generation of a variable-length synchronization flag, the determination of the degree of similarity, and the detection of a synchronization flag are repeated while shifting the bit string bit-by-bit, as described above.

The watermark-information detecting unit 304 detects, as watermark information, the K bits subsequent to the detected synchronization flag. The watermark information may be displayed on, for example, a display unit of the information processing device 5.

With this arrangement, it is possible to appropriately detect the watermark information embedded by the processing described by the first or second embodiment.

An operation of the information processing device 5 in the third embodiment will be described next. FIG. 19 is a flowchart illustrating one example of digital-watermark detection processing in the third embodiment. In the processing illustrated in FIG. 19, N-bit fixed-length synchronization flag generated from Kbit watermark information is detected.

In step S301, the content obtaining unit 301 obtains content in which a synchronization flag is embedded.

In step S302, the information extracting unit 302 detects a bit string from the content by using a detection method corresponding to the embedding method.

In step S303, the information extracting unit 302 determines whether or not the number of extracted bits is larger than K+N. When the number of extracted bits is larger than K+N (YES in step S303), the process proceeds to step S304. When the number of extracted bits is smaller than or equal to K+N (NO in step S303), the process returns to step S302.

In step S304, the synchronization-flag detecting unit 303 generates a synchronization flag from the Kbit bit string while shifting the bit string bit-by-bit and determines the degree of similarity between an N-bit bit string immediately prior to the K bits and the synchronization flag to identify the position of the synchronization flag.

In step S305, the synchronization-flag detecting unit 303 determines whether or not detection of the synchronization flag succeeds. When detection of the synchronization flag succeeds (YES in step S305), the process proceeds to step S306. When detection of the synchronization flag fails (NO in step S305), the process proceeds to step S302. A case in which detection of the synchronization flag succeeds corresponds to, for example, a case in which the degree of similarity is higher than or equal to the threshold.

In step S306, the watermark-information detecting unit 304 detects, as watermark information, a Kbit bit string subsequent to the synchronization flag.

In step S307, the control unit 10 determines whether or not the synchronization-flag detection has been performed on the end of the content. When the end of the content is reached (YES in step S307), the detection processing is finished. When the end of the content is not reached (NO in step S307, the process returns to step S302.

When the variable-length synchronization flag is used, in step S304, the synchronization-flag detecting unit 303 may generate a variable-length synchronization flag from the Kbit bit string to determine the degree of similarity.

According to the third embodiment, it is possible to appropriately detect embedded watermark information by using a fixed-length or variable-length synchronization flag generated from watermark information.

A program for realizing the digital-watermark embedding processing and the digital-watermark detection processing described in each of the above embodiments may be recorded to a recording medium so as to allow a computer to implement the digital-watermark embedding processing and the digital-watermark detection processing in each embodiment. For example, the program may be recorded to a recording medium so as to allow a computer or a mobile-phone device to implement the above-described digital-watermark embedding processing and the digital-watermark detection processing by reading the program from the recording medium.

Various types of recording medium may be used as the recording medium. Examples include recording media to which information is optically, electrically, or magnetically recorded, such as a CD-ROM (compact disc-read only memory), a flexible disk, and an electro-optical disk, and semiconductor memories in which information is electrically recorded, such as a ROM and a flash memory.

The program executed by the information processing device may take a modular form including the units described in each embodiment. Actual hardware is configured so that, when the control unit 10 reads the program from the auxiliary storage unit 30 and executes the program, one or more of the above-described units are loaded to the main storage unit 20 and are generated on the main storage unit 20.

The information processing device 1 is also applicable to content playback players, mobile phones, and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital-watermark embedding device comprising:
a processor; and
a memory which stores a plurality of instructions, which when executed by the processor, cause the processor to execute:
   obtaining content which includes a plurality of frames, and digital-watermark information that differs from a first bit string to each frame of the plurality of frames;
   generating a synchronization flag, which indicates a position of the first bit string in the frame, and which differs from a second bit string to the each frame of the plurality of frames, on a basis of the first bit string of the digital-watermark information; and
   embedding the digital-watermark information and the synchronization flag into the content.

2. The device according to claim 1,
wherein the generating generates a variable-length synchronization flag on a basis of the digital-watermark information.

3. The device according to claim 2,
wherein, with respect to the digital-watermark information, the generating generates the variable-length synchronization flag by using a variable-length table or an encoding algorithm for converting a length into a variable length.

4. The device according to claim 1,
wherein the generating generates the synchronization flag by using at least one of scrambling and exclusive OR.

5. A digital-watermark embedding method executed by a computer, the method comprising:
obtaining content which includes a plurality of frames;
obtaining digital-watermark information that differs from a first bit string to each frame of the plurality of frames;
generating, by a processor, a synchronization flag which indicates a position of the first bit string in the frame, and which differs from a second bit string to the each frame of the plurality of frames, on a basis of the first bit string of the digital-watermark information; and
embedding the digital-watermark information and the synchronization flag into the content.

6. The method according to claim 5,
wherein the generating generates a variable-length synchronization flag on a basis of the digital-watermark information.

7. The method according to claim 6,
wherein, with respect to the digital-watermark information, the generating generates the variable-length synchronization flag by using a variable-length table or an encoding algorithm for converting a length into a variable length.

8. The method according to claim 5,
wherein the generating generates the synchronization flag by using at least one of scrambling and exclusive OR.

9. A digital-watermark detecting device comprising:
an obtaining unit that obtains content;
an extracting unit that extracts a bit string embedded in the content; and
a detecting unit that generates a synchronization flag corresponding to a predetermined bit string in the extracted bit string, determines a correlation value between the synchronization flag and a bit string having the same length as a length of the synchronization flag immediately prior to or subsequent to the predetermined bit string while shifting the predetermined bit string bit-by-bit, and detects a synchronization flag at a position at which the correlation value is the largest in a predetermined range.

10. A digital-watermark embedding device comprising:
a processor; and
a memory which stores a plurality of instructions, which when executed by the processor, cause the processor to execute a process comprising:
   obtaining content which includes a plurality of frames;
   obtaining digital-watermark information that differs from a first bit string to each frame of the plurality of frames;
   generating a synchronization flag which indicates a position of the first bit string in the frame, and which differs from a second bit string to the each frame of the plurality of frames, on a basis of the first bit string of the digital-watermark information; and
   embedding the digital-watermark information and the synchronization flag into the content.

11. The device according to claim 10,
wherein the generating generates a variable-length synchronization flag on a basis of the digital-watermark information.

12. The device according to claim 11,
wherein, with respect to the digital-watermark information, the generating generates the variable-length synchronization flag by using a variable-length table or an encoding algorithm for converting a length into a variable length.

13. The device according to claim 10,
wherein the generating generates the synchronization flag by using at least one of scrambling and exclusive OR.

* * * * *